(12) United States Patent
Cochran et al.

(10) Patent No.: US 8,693,025 B2
(45) Date of Patent: Apr. 8, 2014

(54) PRE-AUTHORIZATION OF PRINT JOBS IN A PRINTING SYSTEM

(75) Inventors: Mary Gale Cochran, Lafayette, CO (US); Silviu Nanau, Giroc (RO); Adrian Vilceanu, Timisoara (RO)

(73) Assignee: Ricoh Production Print Solutions, Boulder, CO (US)

( * ) Notice: Subject to any disclaimer, the term of this patent is extended or adjusted under 35 U.S.C. 154(b) by 296 days.

(21) Appl. No.: 13/236,408

(22) Filed: Sep. 19, 2011

(65) Prior Publication Data

US 2013/0070278 A1 Mar. 21, 2013

(51) Int. Cl.
*H04L 29/06* (2006.01)
*G06K 15/00* (2006.01)

(52) U.S. Cl.
USPC .................................... 358/1.14; 713/166

(58) Field of Classification Search
USPC .............. 358/468, 1.15, 1.18, 1.16, 443, 404, 358/444
See application file for complete search history.

(56) References Cited

U.S. PATENT DOCUMENTS

| | | | |
|---|---|---|---|
| 7,528,978 B2 * | 5/2009 | Randt | 358/1.15 |
| 7,773,243 B2 * | 8/2010 | Ida et al. | 358/1.14 |
| 2005/0122540 A1 | 6/2005 | Kadowaki | |
| 2005/0210227 A1 * | 9/2005 | Emerson et al. | 713/1 |
| 2006/0092453 A1 * | 5/2006 | Okada et al. | 358/1.14 |
| 2006/0221358 A1 * | 10/2006 | Takahashi | 358/1.1 |
| 2007/0035762 A1 | 2/2007 | Wilsher et al. | |
| 2008/0180703 A1 * | 7/2008 | Yamada | 358/1.9 |
| 2008/0223916 A1 * | 9/2008 | Matsumura | 235/375 |
| 2009/0257078 A1 * | 10/2009 | Sawada et al. | 358/1.14 |
| 2009/0323118 A1 * | 12/2009 | Kil et al. | 358/1.15 |
| 2010/0027044 A1 * | 2/2010 | Kil et al. | 358/1.13 |
| 2010/0079805 A1 * | 4/2010 | Hashimoto | 358/1.15 |
| 2010/0134822 A1 * | 6/2010 | Kimura et al. | 358/1.14 |
| 2010/0182624 A1 | 7/2010 | Murakami | |
| 2010/0241543 A1 | 9/2010 | Matsumoto | |
| 2010/0290073 A1 | 11/2010 | Nuggehalli et al. | |
| 2011/0083012 A1 * | 4/2011 | Choi | 713/166 |
| 2011/0102853 A1 * | 5/2011 | Makishima et al. | 358/3.28 |
| 2011/0235096 A1 * | 9/2011 | Iwasawa | 358/1.15 |
| 2011/0249283 A1 * | 10/2011 | Okada et al. | 358/1.9 |
| 2011/0273738 A1 * | 11/2011 | Tanaka et al. | 358/1.14 |
| 2011/0279859 A1 * | 11/2011 | Hashimoto | 358/1.15 |

* cited by examiner

*Primary Examiner* — Jerome Grant, II
(74) *Attorney, Agent, or Firm* — Duft Bornsen & Fettig LLP

(57) ABSTRACT

Systems and methods are provided for pre-authorizing print jobs. The system detects that a printer has entered a secure printing mode that prevents incoming print jobs from printing until credentials have been entered at a console of the printer. The system also receives a print job, receives credentials associated with the print job that identify a user, and determines from the credentials that the user is authorized to use the printer. Additionally, the system is able to transmit the print job to the printer along with a bypass instruction directing the printer to disregard the secure printing mode for this print job.

20 Claims, 5 Drawing Sheets

PRE-AUTHORIZATION OF PRINT JOBS IN A PRINTING SYSTEM

FIELD OF THE INVENTION

The invention relates to the field of printing systems, and in particular, to pre-authorization of print jobs that are submitted for printing.

BACKGROUND

Printing systems often comprise varying combinations of clients, print servers, and networked printers that serve the needs of different users. Often, printers are shared across multiple users in an office. This is generally desirable because each user in the office will have access to the entire range of printing capabilities of the printer (e.g., color printing, photocopying, etc.). However, sharing a printer across an office brings with it a number of potential disadvantages. For example, a user may desire to print confidential information from the printer. If this user is located away from the printer when they submit the job, they will be unable to secure the printed confidential information until they arrive at the printer. This in turn means that the confidential information could be compromised if an unauthorized person viewed the printed job as it waited for pickup at the printer. In a further example, it may be desirable to limit printer access to specific authorized individuals, in order to ensure that the printer is used for business purposes and not personal purposes.

To address these concerns, printers often operate in a secure mode. In secure mode, jobs submitted for printing are held at a print server. The printer refrains from printing the submitted jobs until a user accesses a console at the printer and enters the proper credentials. When the credentials are submitted to the printer, the printer retrieves print jobs for the user stored at the print server. The printer then initiates printing of the jobs. Unfortunately, using a printer in a secure mode may be tedious and time-consuming, because each time a user sends a job to the printer, the user may need to visit the printer and authorize the submitted job.

SUMMARY

Embodiments described herein address the above problems by providing systems and methods for pre-authorizing print jobs submitted to a printer operating in a secure printing mode. When a user submits a print job to a print server, the user may also submit their credentials. The print server is capable of verifying the credentials for the user, and transmitting a bypass instruction to the printer that directs the printer to directly print the job without waiting for entry of credentials through a console at the printer. Thus, even in a secure printing environment, a user may enjoy the benefits of remotely printing a print job.

One embodiment is a system that pre-authorizes print jobs for a printer. The system includes a print server coupled for communication with the printer. The print server includes an interface and a control system. The interface is able to receive a print job, and to receive credentials associated with the print job that identify a user. The control system is able to detect that the printer has entered a secure printing mode that prevents incoming print jobs from printing until credentials have been entered at a console of the printer. The control system is further able to determine from the credentials that the user is authorized to use the printer, and to transmit the print job to the printer along with a bypass instruction directing the printer to disregard the secure printing mode for this print job.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
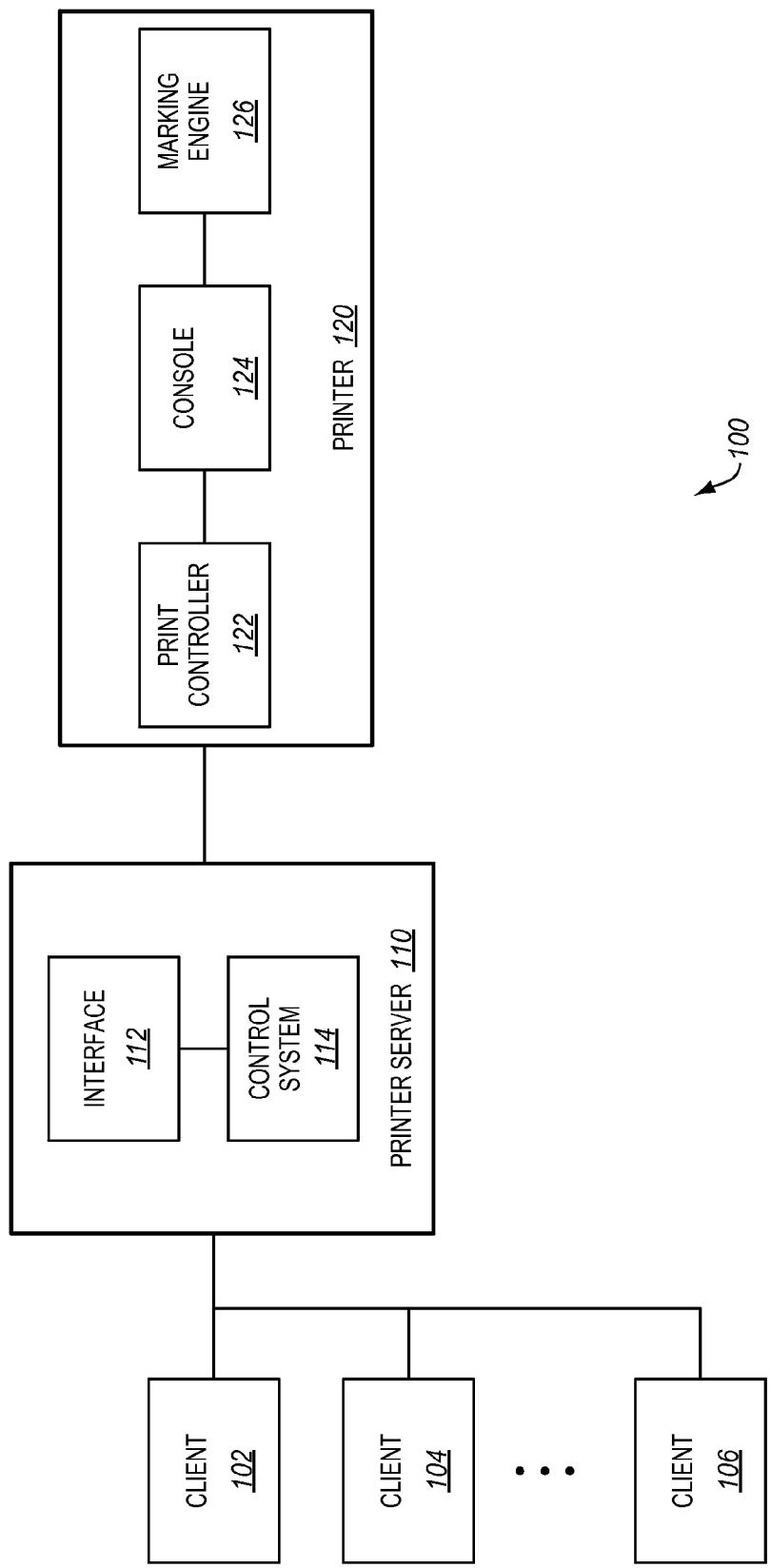
FIG. 1 is a block diagram of a printing system in an exemplary embodiment.

FIG. 1 is a block diagram of a printing system 100 in an exemplary embodiment. Printing system 100 comprises any system operable to process and print incoming jobs. In this embodiment, printing system 100 comprises clients 102-106, coupled with printer 120 via print server 110. Clients 102-106 may be software and/or hardware entities that submit print jobs to print server 110. There may be any number of clients 102-106 operating within printing system 100.

Print server 110 is operable to receive incoming print jobs and manage the distribution of those print jobs to one or more printers 120 (e.g., via a network). In this embodiment, print server 110 comprises interface 112 and control system 114. Interface 112 is operable to receive print jobs and other information from any of clients 102-106, and control system 114 is operable to control the operations of print server 110.

Printer 120 comprises any system or device operable to receive incoming print data and mark a media (e.g., paper) based upon the print data. In this embodiment, printer 120 comprises print controller 122, console 124, and marking engine 126.

Print controller 122 is operable to control the operations of printer 120. Additionally, print controller 122 may be operable to process incoming print data and convert it into a format used by marking engine 126. For example, print controller 122 may rasterize print data received from print server 110.

Console 124 provides an interface to printer 120. Console 124 may additionally be utilized when printer 120 enters a secure printing mode. For example, print controller 122 may be configured to hold a print job until it has received credentials from a user present at console 124.

Marking engine 126 comprises any system or device operable to generate printed media based upon incoming print data. For example, marking engine 126 may comprise a laser printing system, an ink jet printing system, or other components operable to mark ink or toner onto a tangible media (e.g., paper).

With printing system 100, a user may utilize enhanced features of print server 110 and printer 120 in order to pre-authorize incoming print jobs for printing. Thus, a user may still reap the benefits of secure printing, but need not be physically present at a printer in order to release incoming jobs for printing.

Further details of the operation of printing system 100 will be discussed with regard to FIG. 2. Assume, for this embodiment, that printer 120 is operating in a secure printing mode that automatically prevents incoming secure print jobs from printing unless an authorization is entered at console 124. Further, assume that print server 110 is capable of receiving, processing, and holding incoming print jobs received from clients 102-106.

Figure 2:
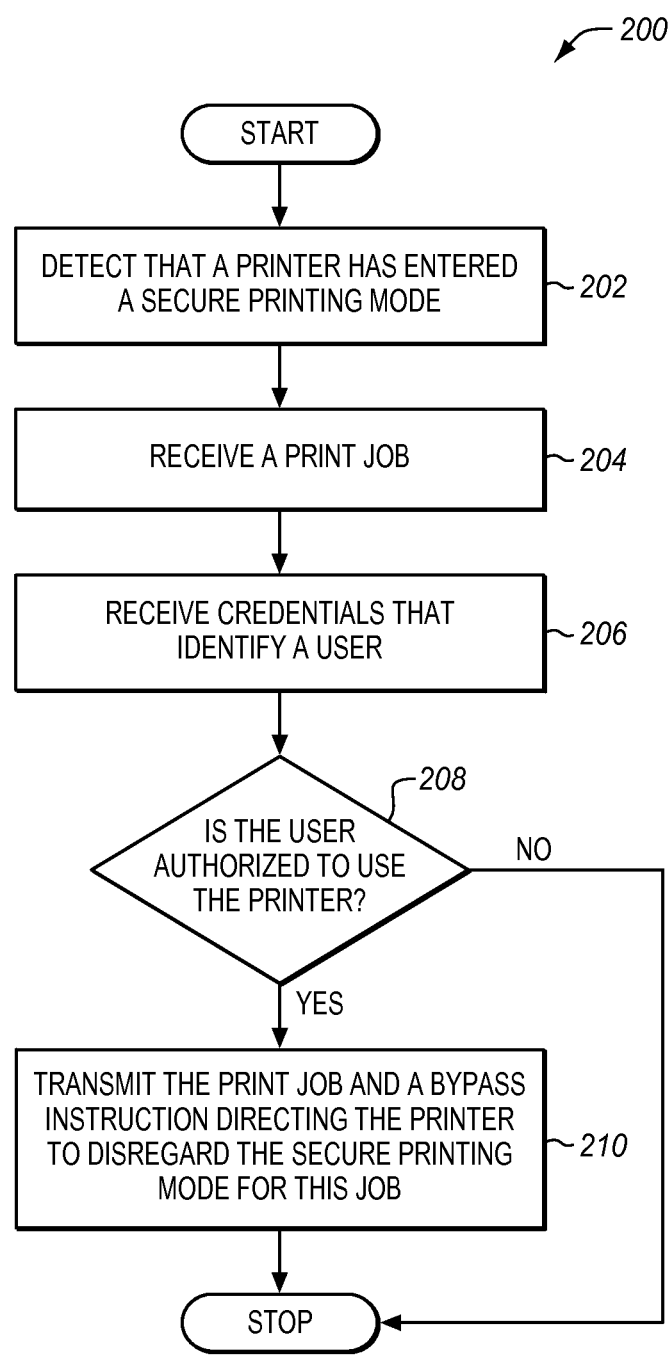
FIG. 2 is a flowchart illustrating a method for pre-authorizing a print job in an exemplary embodiment.

FIG. 2 is a flowchart illustrating a method 200 for pre-authorizing a print job in an exemplary embodiment. The steps of method 200 are described with reference to printing system 100 of FIG. 1, but those skilled in the art will appreciate that method 200 may be performed in other systems or devices. The steps of the flowcharts described herein are not all inclusive and may include other steps not shown. The steps described herein may also be performed in an alternative order.

In step 202, control system 114 of print server 110 detects that printer 120 has entered a secure printing mode. A secure printing mode may, for example, indicate that printer 120 will no longer print incoming print jobs unless credentials are provided at console 124. In one embodiment, the secure printing mode may be used for specific users or jobs that have been flagged as "secure." Control system 114 may, for example, detect that printer 120 has entered a secure printing mode by querying printer 120, by receiving a notification from printer 120, or by scanning metadata associated with a print job (e.g., a job ticket), and then determining that a print job directed to printer 120 has been flagged for secure printing.

In step 204, interface 112 receives a print job. The print job itself may exist as print data accompanied by a job ticket and/or metadata, and the print data may exist in a number of formats (e.g., the print data may be defined according to a page description language, may be rasterized, etc.).

In step 206, interface 112 receives credentials associated with the print job that identify a user. The credentials accompanying the print job may be defined, for example, within a job ticket for the print job. In some embodiments print server 110 requests the credentials from the user. This may happen, for example, when control system 114 detects that an incoming print job is directed to a printer operating in a secure printing mode, or when a user logs on to one of clients 102-106. Credentials may comprise any information that may be used to authenticate the user or entity that wishes to release a job for printing. For example, credentials may comprise a security code such as a user name and a passcode. In other embodiments, biometric information (e.g., fingerprints, facial recognition, voice, etc.) may be submitted as credentials to authenticate the user.

In step 208, control system 114 determines from the credentials that the user is authorized to use the printer. For example, control system 114 may compare a submitted user name to a list of authorized users, and may compare a submitted password to a known password stored for that user. In some embodiments, control system 114 may query an authorization server (such as a Lightweight Directory Access Protocol (LDAP) server) to determine whether the credentials are genuine. Additionally, there may be multiple security levels implemented at printer 120. Because of this, print server 110 may store multiple passwords for each user, each password relating to a different level of security. It is not necessary that the credentials submitted to print server 110 always comprise a user name and password. In some embodiments, it may be desirable for print server 110 to simply store a list of passwords, each password relating to a level of security. In this manner, the same passwords would be shared across groups of users of printing system 100.

If the credentials are determined to not be authentic, or the user is determined to be unauthorized, control system 114 may perform a number of actions. For example, control system 114 may hold the print job, request that the credentials be re-entered, restrict further printing at the client that submitted the credentials, transmit a warning to another network entity, and/or provide options for recovering password information from the server. In some embodiments, when the user is not authorized to use the printer, the print job is held at print server 110 until credentials are physically entered at console 124 of printer 120.

If control system 114 determines that the user is authorized to use the printer, then print server 110 transmits the print job to printer 120, along with a bypass instruction for the printer to disregard the secure printing mode for this job, as in step 210. This bypass instruction commands printer 120 to print the incoming job even though printer 120 is operating in a secure printing mode and would not normally allow incoming data to be printed (at least not without credentials being provided at console 124). In some embodiments, the bypass instruction is unique to printer 120, print server 110, or the submitted print job. For example, the bypass instruction may provide a name or serial number for print server 110, along with an instruction indicating that the job should be immediately printed. If the bypass instruction is unique to printer 120, print server 110 may store multiple bypass instructions, indexed by printer. The bypass instruction itself may be inserted into the job ticket, may accompany the print job, or may be transmitted entirely separately from the print job. The bypass instruction may also relate to one or more print jobs. If the print job is transmitted over a network, it may further be desirable to encrypt one or both of the print job and the bypass instruction, to prevent the print data being intercepted and interpreted by an unauthorized network entity.

Using method 200 described above, a user may pre-authorize a print job selected for secure printing. Thus, the user need not enter information at a console of the printer in order to securely print a document. This in turn allows a user to direct an employee to pick up a secure print job, without requiring the user to provide the employee with a password for secure printing.

EXAMPLES

In the following examples, additional processes, systems, and methods are described in the context of a printing system 100 that allows for pre-authorization of secure print jobs.

Figure 3:
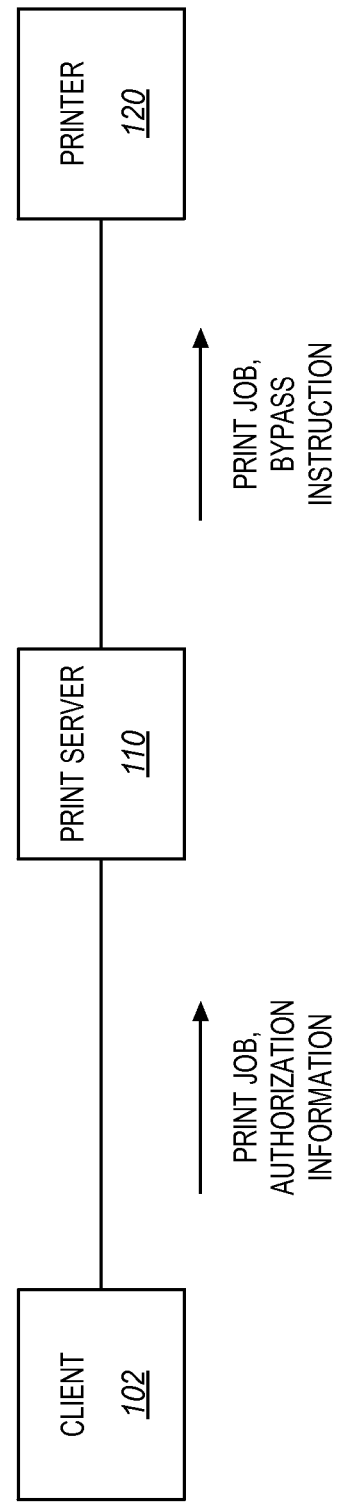
FIG. 3 is a block diagram illustrating a process flow for pre-authorization of a print job in an exemplary embodiment.

FIG. 3 is a block diagram illustrating a process flow for pre-authorization of a print job in an exemplary embodiment. According to FIG. 3, client 102 transmits both the print job and credentials to print server 110. Print server 110 authenticates the credentials, and transmits the print job, along with a bypass instruction, to printer 120. Printer 120, having received the bypass instruction, releases the print job for printing without waiting for confirmation at a console. Thus, the process flow illustrated by FIG. 3 streamlines the processing of incoming print jobs and allows for print jobs to be pre-authorized (i.e., authorized before they are sent to a printer).

Figure 4:
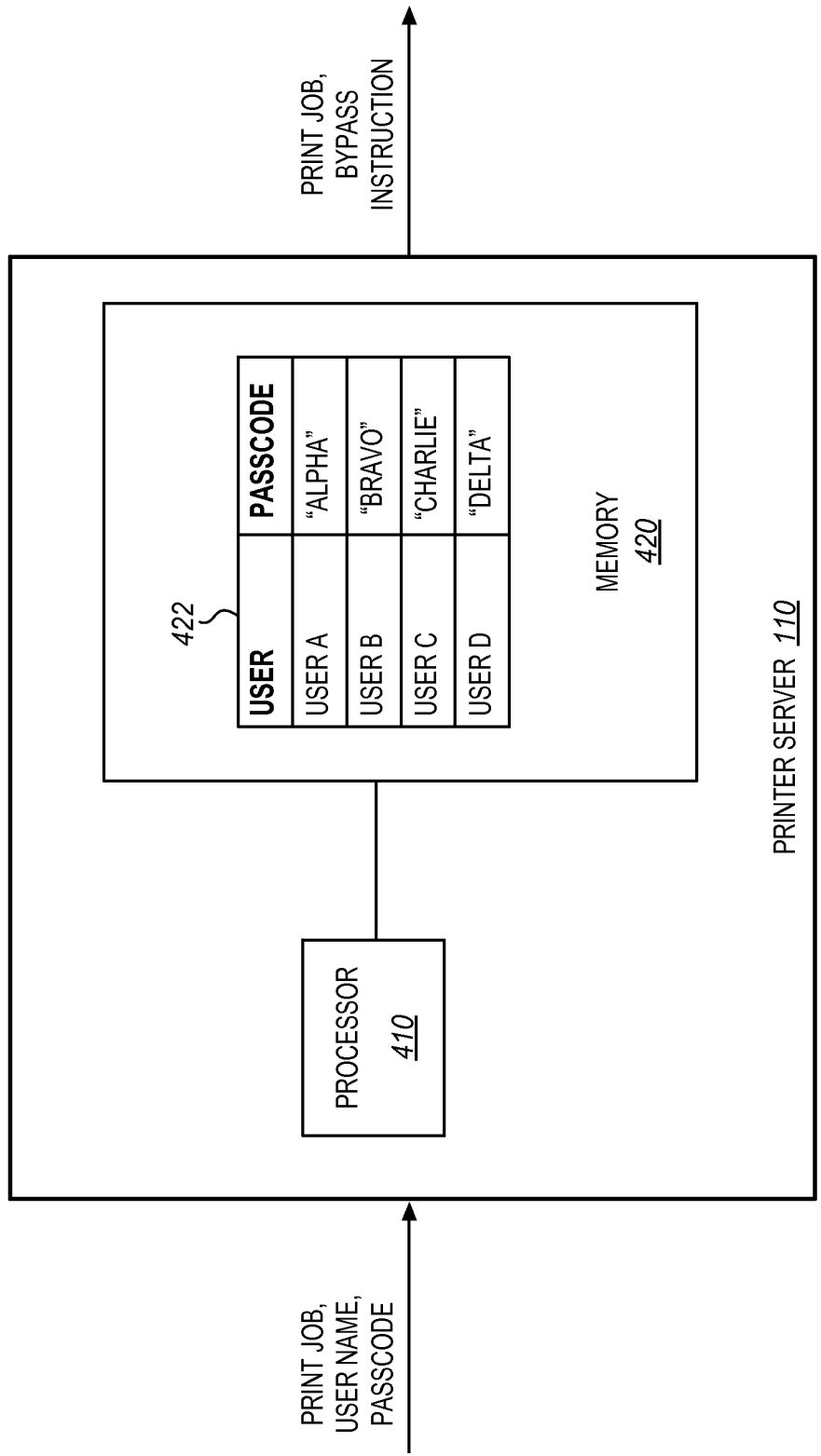
FIG. 4 illustrates a print server for pre-authorizing a print job in an exemplary embodiment.

FIG. 4 illustrates a print server 110 for pre-authorizing a print job in an exemplary embodiment. According to FIG. 4, print server 110 includes a processor 410 and a memory 420. Memory 420 includes a user list 422 and a bypass instruction. User list 422 comprises a set of authorized users for printer 120. In this embodiment, print server 110 receives a print job. Processor 410 of print server 110 parses a job ticket of the print job and determines that the print job is flagged as secure. Thus, processor 410 additionally parses the job ticket to detect a user name and passcode. Upon finding the user name and passcode, processor 410 compares them to user names and passcodes stored in user list 422. This process may be implemented, for example, via a hash table in order to increase the speed of the comparison process. In this example, the user name and passcode match one stored at user list 422. Thus, processor 410 inserts a bypass instruction into the job ticket, and removes the user name and passcode from the job ticket. Print server 110 then transmits the revised print job to printer 120 for printing. When printer 120 receives the print job, it parses the job ticket to detect the bypass instruction. Once the bypass instruction has been received and processed, printer 120 initiates printing of the job.

Figure 5:
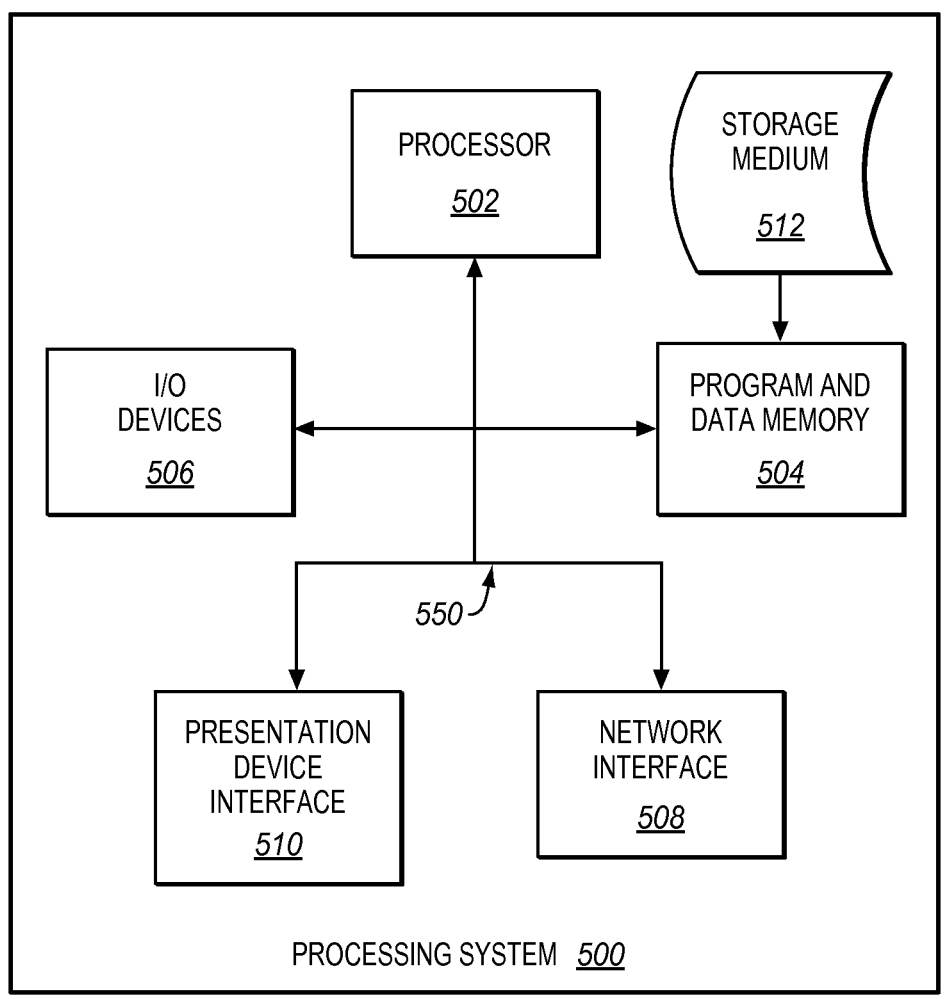
FIG. 5 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of printing system 100 to perform the various operations disclosed herein. FIG. 5 illustrates a processing system 500 operable to execute a computer readable medium embodying programmed instructions to perform desired functions in an exemplary embodiment. Processing system 500 is operable to perform the above operations by executing programmed instructions tangibly embodied on computer readable storage medium 512. In this regard, embodiments of the invention can take the form of a computer program accessible via computer-readable medium 512 providing program code for use by a computer or any other instruction execution system. For the purposes of this description, computer readable storage medium 512 can be anything that can contain or store the program for use by the computer.

Computer readable storage medium 512 can be an electronic, magnetic, optical, electromagnetic, infrared, or semiconductor device. Examples of computer readable storage medium 512 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 500, being suitable for storing and/or executing the program code, includes at least one processor 502 coupled to program and data memory 504 through a system bus 550. Program and data memory 504 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 506 (including but not limited to keyboards, displays, pointing devices, etc.) can be coupled either directly or through intervening I/O controllers. Network adapter interfaces 508 may also be integrated with the system to enable processing system 500 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 510 may be integrated with the system to interface to one or more presentation devices, such as printing systems and displays for presentation of presentation data generated by processor 502.

Although specific embodiments were described herein, the scope of the invention is not limited to those specific embodiments. The scope of the invention is defined by the following claims and any equivalents thereof.

We claim:

1. A print server coupled for communication with a printer, the print server comprising:
an interface operable to receive a print job and to receive a job ticket for the print job that includes credentials that identify a user;
a control system operable to detect that the printer has entered a secure printing mode that prevents incoming print jobs from printing until the credentials have been entered at a console of the printer, to determine from the credentials that the user is authorized to use the printer, to remove the credentials from the job ticket responsive to determining that the user is authorized, to modify the job ticket by inserting a bypass instruction into the job ticket of the print job, wherein the bypass instruction directs the printer to disregard the secure printing mode for this print job, and to transmit the print job to the printer along with the modified job ticket.

2. The print server of claim 1, wherein:
the credentials comprise a user name and passcode; and
the control system is further operable to determine that the user is authorized to use the printer by comparing the user name and passcode to a set of authorized users stored in memory.

3. The print server of claim 1, wherein:
the control system is further operable to parse the job ticket to acquire the credentials.

4. The print server of claim 1, wherein:
the control system is further operable to generate a bypass instruction that comprises information describing the print server.

5. The print server of claim 1, wherein:
the control system is further operable to parse the print job to determine that the printer has entered the secure printing mode.

6. The print server of claim 1, wherein:
the control system is further operable to hold the print job, responsive to determining that the credentials are invalid.

7. The print server of claim 1, wherein:
the print server is coupled for communication with the printer via a network.

8. A method, comprising:
detecting that a printer has entered a secure printing mode that prevents incoming print jobs from printing until credentials have been entered at a console of the printer;
receiving a print job;
receiving a job ticket for the print job that includes credentials that identify a user;
determining from the credentials that the user is authorized to use the printer;

removing the credentials from the job ticket, responsive to determining that the user is authorized;

modifying the job ticket by inserting a bypass instruction into the job ticket of the print job, wherein the bypass instruction directs the printer to disregard the secure printing mode for this print job; and transmitting the print job to the printer along with the modified job ticket.

9. The method of claim 8, wherein:

the credentials comprise a user name and passcode, the method further comprising:

determining that the user is authorized to use the printer by comparing the user name and passcode to a set of authorized users stored in memory.

10. The method of claim 8, further comprising:

parsing the job ticket to acquire the credentials.

11. The method of claim 8, further comprising:

generating a bypass instruction that comprises information describing the print server.

12. The method of claim 8, further comprising:

parsing the print job to determine that the printer has entered the secure printing mode.

13. The method of claim 8, further comprising:

holding the print job, responsive to determining that the credentials are invalid.

14. The method of claim 8, further comprising:

transmitting the bypass instruction via a network.

15. A non-transitory computer readable medium embodying programmed instructions which, when executed by a processor, are operable for performing a method, the method comprising:

detecting that a printer has entered a secure printing mode that prevents incoming print jobs from printing until credentials have been entered at a console of the printer;

receiving a print job;

receiving a job ticket for the print job that includes credentials that identify a user;

determining from the credentials that the user is authorized to use the printer;

removing the credentials from the job ticket, responsive to determining that the user is authorized;

modifying the job ticket by inserting a bypass instruction into the job ticket of the print job, wherein the bypass instruction directs the printer to disregard the secure printing mode for this print job; and transmitting the print job to the printer along with the modified job ticket.

16. The medium of claim 15, wherein:

the credentials comprise a user name and passcode, the method further comprising:

determining that the user is authorized to use the printer by comparing the user name and passcode to a set of authorized users stored in memory.

17. The medium of claim 15, wherein the method further comprises:

parsing the job ticket to acquire the credentials.

18. The medium of claim 15, wherein the method further comprises:

generating a bypass instruction that comprises information describing the print server.

19. The medium of claim 15, wherein the method further comprises:

parsing the print job to determine that the printer has entered the secure printing mode.

20. The medium of claim 15, wherein the method further comprises:

holding the print job, responsive to determining that the credentials are invalid.

\* \* \* \* \*